United States Patent Office 3,078,263
Patented Feb. 19, 1963

3,078,263
NEW POLYMERIZATION CATALYST, ITS PREPARATION AND USE
Richard S. Stearns, Malvern, Pa., assignor to The Firestone Tire & Rubber Company, Akron, Ohio, a corporation of Ohio
No Drawing. Filed Oct. 10, 1960, Ser. No. 61,364
11 Claims. (Cl. 260—94.3)

This invention relates to a process for the polymerization of butadiene to yield rubbery polymers having structural units largely of the cis-1,4 configuration, and to catalytic compositions useful in said process and their production.

Butadiene, being the simplest and most available of the conjugated dienes, has served as the basis of an extensive technology for the preparation of polymers designed to serve the functions of Hevea rubber. The polymers of of butadiene heretofore produced, while they have served as practical substitutes for Hevea rubber in many applications, nevertheless fail to match natural Hevea rubber in many properties, notably in internal friction and resilience properties. It appears that these deficiences result from the irregular configurations in which the butadiene units enter the polymers heretofore prepared therefrom, and that greatly superior products would result if greater proportions of the butadiene units entered the polymeric chain in what is known as the cis-1,4 configuration, i.e., in the form of units having the formula:

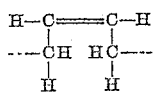

The resultant configuration, since it is homologous to the structure of Hevea rubber, should on theoretical grounds, and in point of fact does, exhibit properties superior to those of the random butadiene polymers heretofore produced.

Accordingly, it is an object of this invention to provide a means for the polymerization of butadiene to yield polymers of superior properties.

A further object is to provide such polymers having superior internal friction and resilience properties in comparison with conventional butadiene polymers.

A further object is to provide a novel catalytic process for the polymerization of butadiene to yield polymers in which the polymeric butadiene unit occurs largely in the cis-1,4 configuration above referred to.

A still further object is to provide novel catalysts for carrying out the process of this invention.

Synopsis of the Invention

The above and other objects are secured, in accordance with this invention, by polymerizing butadiene in contact with composite catalysts made from aluminum alkyls, titanium chlorides and HCN. The titanium chlorides—TiCl$_4$, TiCl$_3$ and TiCl$_2$—can be used separately or in admixtures. The HCN reacts with aluminum alkyl to produce an alkyl aluminum cyanide. In the final catalyst, the mole ratios of the several components used in the preparation of the catalyst should lie between the following limits:

$$\frac{\text{Moles of aluminum}}{\text{Moles of titanium}} = 1/1 \text{ to } 30/1$$

$$\frac{\text{Gram-equivalents of cyanide radical}}{\text{Gram-equivalents of titanium}} = 0.25/1 \text{ to } 50/1$$

The polymerization is effected by contacting butadiene with the catalyst, preferably at temperatures in the range of −40° C. to +150° C., and also preferably under sufficient pressure to maintain the butadiene in the liquid phase.

The Alkyl Aluminum Cyanide

Any aluminum alkyl containing one or more alkyl groups containing from 1 to 30 carbon atoms in each alkyl group may be employed in preparing the alkyl aluminum cyanide. Most commonly, there will be employed a trialkyl aluminum compound, but mono- and dialkyl aluminum chlorides can be used. Examples of suitable alkyls are trimethyl aluminum, triethyl aluminum, tripropyl aluminum, tributyl aluminum, trioctyl aluminum, dimethyl hexyl aluminum, tridodecyl aluminum and the like; dialkyl aluminum chlorides are dimethyl aluminum chloride, diethyl aluminum chloride, dipropyl aluminum chloride, didodecyl aluminum chloride, methyl hexyl aluminum chloride, and the like; and of monoalkyl aluminum dichlorides are methyl, ethyl, propyl, butyl, hexyl, octyl and dodecyl aluminum dichlorides. It will be understood that any mixtures of the alkyl aluminums above indicated as being suitable may be used, it being further understood that a mole of dialkyl monochlorides or of monoalkyl dichlorides will only count for two-thirds of a mole and one-third of a mole respectively in calculating the ratios of constituents. The alkyl aluminum cyanide can be produced by reacting alkyl aluminum with hydrogen cyanide.

The Cyanide

The cyanide radical is attached to aluminum. Thus, it may be aluminum monoalkyl dicyanide or aluminum dialkyl cyanide. Such compounds as the aluminum alkyl chloride would no doubt produce the same alkyl cyanides as are obtained from the trialkyl aluminums. Any alkyl group of 1 to 30 carbon atoms may be used. Mixtures of the cyanides may be employed.

The Catalysts

The aluminum alkyl cyanide and titanium tetrachloride which are the components of the catalysts of this invention may be brought together and into contact with the butadiene in substantially any order, provided of course, that the overall ratios of the materials so brought together lie within the limits set forth above. For instance, the ingredients may be mixed together simultaneously, preferably in the presence of a suitable inert solvent, so that the catalyst forms a slurry for convenient handling. Suitable solvents are any of the hydrocarbons containing up to 40 carbons, or preferably up to 16 carbons, such as paraffins on the order of propane, butane, hexane, cyclohexane, petroleum ether, kerosene, diesel oil or the like, or aromatic hydrocarbons such as benzene, toluene, xylene or the like. Alternatively, one of the components may be added later, either before or after the other has been brought into contact with the butadiene to be polymerized; for instance, the titanium chloride may be added first, and the alkyl aluminum cyanide added later, either before or after the first has been introduced into the butadiene. Further, portions of one or more of the ingredients may be withheld at one or more steps in the process, and added later. Thus the titanium chloride and a portion of the alkyl aluminum cyanide may be combined first, and thereafter the remainder of the alkyl aluminum cyanide may be added; or a portion of the alkyl aluminum cyanide may be added first, followed by a portion of the titanium salt, and then by a mixture of alkyl aluminum cyanide and the titanium salt; and so on.

The ratio of the moles of Al/Ti is determined directly as the ratio of the moles of the aluminum alkyl cyanide to the moles of titanium chloride; but the ratio of the gram-atoms of CN/Ti is determined by dividing ⅓ or ⅔ of the number of the gram atoms of aluminum dialkyl monocyanide or aluminum monoalkyl dicyanide, respectively, by the gram atoms of the titanium chloride employed. According to this invention the mole ratio of aluminum to titanium is 1/1 to 30/1 and the gram-atoms ratio of cyanide groups to titanium is 1/1 to 50/1.

*The Polymerization Procedure and Properties of the Polymers*

The polymerization is carried out by contacting butadiene with the catalyst, preferably at temperatures in the range −40° C. to 150° C., although higher or lower temperatures may be used. Usually, there will be present an inert solvent, which may be, for instance, any of the cyclic or paraffinic hydrocarbons suggested above for the preparation of the catalyst. The reaction medium should be as far as possible free from polar compounds, other than the traces noted above as being helpful in promoting the reaction, which would react with and destroy the catalyst. Preferably, but not necessarily, sufficient pressure is applied to maintain the butadiene in the liquid phase. Likewise, the polymerization process should be agitated to keep the catalyst particles dispersed throughout the polymerization mass, at least until the viscosity has increased to such a degree that the catalyst will no longer settle out. When the polymerization has proceeded to the desired degree, the polymerized butadiene is recovered in any suitable way; for instance, if the reaction has been carried out in a hydrocarbon solvent, the resultant solution can be mixed with methyl ethyl ketone, methanol, isopropanol or other non-solvent for the polymer, which will precipitate in the form of a crumb which can be milled, calendered, extruded, etc. upon conventional rubber machinery. The polymer may also be recovered by evaporating the solvent, for instance by injection into hot water, or passing through a heated extruder, drum drier apparatus or the like.

The butadiene polymers produced in accordance with this invention will be found to have the butadiene units polymerized therein to a large extent, say 75 percent or better, and in the optimum cases 90 percent or better, in the cis-1,4 configuration. This improved chemical configuration is reflected in the greatly improved rubbery properties of the polymers, the vulcanizates of which have much reduced internal friction, and much better resilience and tensile strength as compared to polybutadienes heretofore prepared.

The proportions of cis-1,4-, trans-1,4- and 1,2-configurations reported hereinafter were determined by infrared analysis. The relative concentrations of the several structures was obtained by measurement of the transmission of film samples at wave lengths for the respective structures, and using extinction coefficients, as follows:

| Structure | Cis-1,4 | Trans-1,4 | 1,2 |
| --- | --- | --- | --- |
| Wave length (λ) | 6 | 10.34 | 10.98 |
| Extinction coefficient | 6.4 | 110 | 140 |

In order to provide a partial correction for absorption due to other structures, the absorbence measurement for any given wave length is measured on the spectrum chart, not to a base line of 100 percent transmission, but rather to a line tangent to the transmission maxima on either side of the band under consideration.

The polymers may be vulcanized by substantially the same sulfur, sulfur and accelerator, peroxide, and other systems by which conventional butadiene-based rubbers are vulcanized, to yield products which are useful in pneumatic tires (particularly as the tread and body stocks thereof), resilient rubber mountings, torsion springs and the like.

With the foregoing general discussion in mind, there is given herewith a detailed example of the practice of this invention. All parts given are by weight.

1,3-butadiene was polymerized in beverage-type bottles. The bottles were dried in an air oven before use. Benzene was washed with sulfuric acid, passed through a KOH column and distilled over sodium before use. Two hundred grams of this benzene was distilled into the hot, dried bottle in a closed system in the presence of nitrogen. Butadiene was dried over calcium hydride and 50 grams was transferred, in a closed system, to the polymerization bottle containing the solvent.

The alkyl aluminum cyanide catalyst was formed by reacting 1.0 mole triethyl aluminum with the stoichiometric amount of dry, liquid HCN. Four milliliters of the resulting 1.0 M Al(Et)$_2$CN were injected into the polymerization bottle. This was followed by 5.0 ml. of 0.1 M TiCl$_4$. The ratio of effective moles of aluminum to moles of titanium is 8/1; and the ratio of the gram-equivalents of cyanide radical to gram atoms of titanium is 8/1.

Polymerization was conducted in a rotating bath thermostated at 30° C. At the completion of polymerization the polymer was recovered by coagulation in methanol containing antioxidant. Solvent was removed by placing the polymer in boiling water. The polymer was dried at 50° C. in a vacuum.

The polymer was purified for infrared measurement of microstructure by solution in toluene, filtration and reprecipitation in acetone. The following data were obtained.

*Infrared Analysis*

| cis-1,4 | trans-1,4 | 1,2 |
| --- | --- | --- |
| 88.4 | 7.5 | 4.1 |

The ratio of the different catalyst components can be varied widely as indicated herein. For instance, in another run the ratio of the effective moles of aluminum to moles of titanium was 4/1, and the ratio of gram equivalents of cyanide radical to gram atoms of titanium only 2/1. Wide variation is permissible as set forth herein with some change in the content of cis-1,4 configuration of the polymer content, within the range set forth.

From the foregoing general description and detailed specific example, it will be evident that this invention which is covered in the appended claims, provides a novel process and catalyst for the polymerization of butadiene to yield polymers having greatly improved polymeric structure from the standpoint of cis-1,4 structure.

What is claimed is:

1. Process of polymerizing butadiene to yield polymers containing the polymerized butadiene units largely in cis-1,4 configuration therein, which process comprises contacting butadiene with a catalyst which is a reaction product of an alkyl aluminum cyanide with a titanium chloride, each alkyl containing 1 to 30 carbon atoms and the ratio of the components of the catalyst being as follows:

$$\frac{\text{Moles of aluminum}}{\text{Moles of titanium}} = 1/1 \text{ to } 30/1$$

2. The process of claim 1 in which the alkyl aluminum cyanide is diethyl aluminum cyanide.

3. The process of claim 1 in which the titanium chloride is titanium tetrachloride.

4. A catalytic composition which is a reaction product of an alkyl aluminum cyanide and a titanium chloride, the alkyl containing 1 to 30 carbon atoms, the ratio of the components of the catalyst being as follows:

$$\frac{\text{Moles of aluminum}}{\text{Moles of titanium}} = 1/1 \text{ to } 30/1$$

5. The catalytic composition of claim 4 which is the reaction product of diethyl aluminum cyanide and a titanium chloride.

6. The catalytic composition of claim 4 which is the reaction product of titanium tetrachloride.

7. The process of producing a catalytic composition which comprises reacting essentially an alkyl aluminum in which the alkyl contains 1 to 30 carbon atoms, with a titanium chloride and hydrogen cyanide, the ratio of the components of the reaction mixture being as follows:

$$\frac{\text{Moles of aluminum}}{\text{Moles of titanium}} = 1/1 \text{ to } 30/1$$

$$\frac{\text{Moles of cyanide radical}}{\text{Moles of titanium}} = 0.25/1 \text{ to } 50/1$$

the moles of aluminum being calculated as the sum of the moles of trialkyl aluminums, plus ⅔ of the moles of dialkyl aluminums, plus ⅓ of the moles of monoalkyl aluminums, in the system.

8. The process of claim 7 in which the titanium chloride is titanium tetrachloride.

9. The process of producing a catalytic composition which comprises reacting essentially diethyl aluminum cyanide and a titanium chloride, the molar ratio of the components of the reaction mixture being as follows:

$$\frac{\text{One-half of the moles of aluminum}}{\text{Moles of titanium}} = 1/1 \text{ to } 30/1$$

10. The process of claim 9 in which the titanium chloride is titanium tetrachloride.

11. The process of claim 1 in which the catalyst is a reaction product of an alkyl aluminum in which the alkyl contains 1 to 30 carbon atoms, a titanium chloride and hydrogen cyanide.

References Cited in the file of this patent

UNITED STATES PATENTS

| | | |
|---|---|---|
| 2,886,561 | Reynolds | May 12, 1959 |
| 2,921,056 | Stuart | Jan. 12, 1960 |

FOREIGN PATENTS

| | | |
|---|---|---|
| 1,187,678 | France | Sept. 15, 1959 |